July 9, 1963  P. JACKSON  3,096,656
TRANSDUCER
Filed April 23, 1959  2 Sheets-Sheet 1

INVENTOR.
PHILIP JACKSON
BY
Richard J. Seeger
ATTORNEY

July 9, 1963 P. JACKSON 3,096,656
TRANSDUCER

Filed April 23, 1959 2 Sheets-Sheet 2

INVENTOR.
PHILIP JACKSON
BY
Richard J. Seeger
ATTORNEY nited States Patent Office 3,096,656
Patented July 9, 1963

3,096,656
TRANSDUCER
Philip Jackson, Ann Arbor, Mich., assignor to The Bendix Corporation, a corporation of Delaware
Filed Apr. 23, 1959, Ser. No. 808,508
11 Claims. (Cl. 73—517)

This invention pertains to a transducer of the type where relative physical movement between two objects is converted to a corresponding electrical signal.

It is an object of this invention to provide a transducer having a signal carrying resistive element against which is placed, in shunting contact, a conductive member with physical movement of the conductive member transversely of the resistive member resulting in an increasing shunting contact with the resistive element to reduce the resistance and increase the signal therethrough.

It is another object of this invention to provide in such a transducer a resistive element comprising a supported coil of resistive material and to provide a conductive member of an elastic material with a conductive surface, with the conductive member displaceable longitudinally of the coil to successively engage and shunt the individual loops as the conductive member is moved transversely towards the coil.

It is a further object of this invention to provide a transducer adapted for use as an accelerometer for measuring the magnitude and direction of acceleration, which is of a simple construction, of economical fabrication, and capable of miniaturization so that it may be be used in missile systems and other systems where space is at a premium.

It is another object of this invention to provide an accelerometer having a multiplicity of resistive elements secured at their ends in a housing and to have a conductive inertia member in simultaneous contact with the resistive elements so that acceleration of the housing will result in increasing or decreasing pressure of the inertia member against the resistive elements thereby changing the contact area and contact pressure therebetween, resulting in resistive changes of the elements which are measured in metering circuits to determine the direction and magnitude of the housing acceleration.

It is a further object of this invention to provide in such an accelerometer an inertia member having cylindrical surfaces in contact with the resistive elements whereby only movement of the inertia member transverse to the resistive elements will result in a change of the shunting contact between the inertia member and the resistive element.

It is another object of this invention to provide a spring loading between the inertia member and the housing to reduce the number of required inertia elements to three for sensing acceleration in all directions.

These and other objects will become more apparent when a detailed description of several preferred embodiments is made in connection with the drawings in which.

Figure 1:
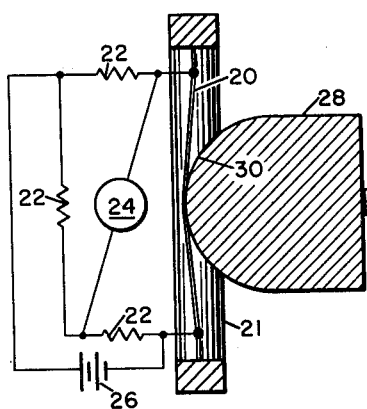
FIGURE 1 shows schematically a conductive member in shunting contact with a single resistive element and its metering circuit.

Shown in FIGURE 1 is an embodiment which may be used in a number of applications including a pressure gage, weighing instrument, strain gage, and other uses where it is desired to accurately convert a physical movement into a corresponding electrical current. Resistive element 20 is formed of an elastic current carrying material such as Chromel A resistive wire (80 percent nickel and 20 percent chromium) and is supported or secured at each end to a housing 21. Connected to the ends of element 20 is a bridge circuit having resistances 22, meter 24 and power supply 26. As will be understood, the degree of any change in resistance of element 20 is accurately indicated on meter 24.

Figure 2:
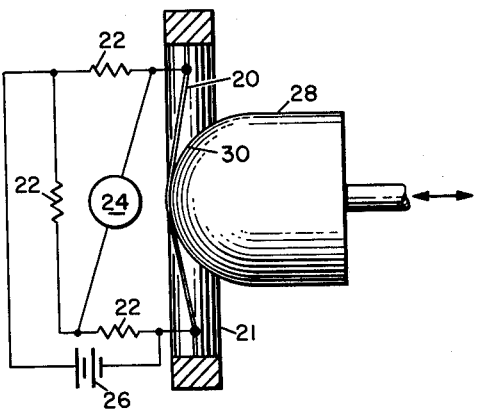
FIGURE 2 is a view similar to FIGURE 1 wherein the shunting contact between conductive member and the resistive element has been changed due to movement of the conductive element.

Member 28, which is formed of a material having substantially greater electrical conductivity than element 20, has an arcuate end portion 30 which is in electrical contact with an intermediate portion of element 20, with the length of contact and contact pressure being determined by the position of member 28. As member 28 is moved leftwardly, the length of contact and contact pressure with element 20 is increased as is evidenced from FIGURE 2 and this in turn will reduce the resistance between the ends of element 20 since in effect element 20 is shunted by its contact with the arcuate surface 30 reducing the resistance along the shunted portion. Any movement rightwardly of member 28 will, of course, decrease the length of contact and the current in element 20.

The physical motion of member 28 is, therefore, converted to a corresponding electrical signal, and in this case across meter 24 which may be used as a measuring device. Instead of meter 24 there may be an actuating device which controls or actuates a third element.

The contact between the conducting member 28 and the resistive element 20 may not result in the desired linearity between the movement of the conductive member and the signal through the resistive element. The characteristics of the system can be altered to provide linearity by properly forming the contour of the contacting surface 30 of the conductive member and/or by varying the resistance along the resistive element 20 in the area of conductive member contact.

Figure 3:
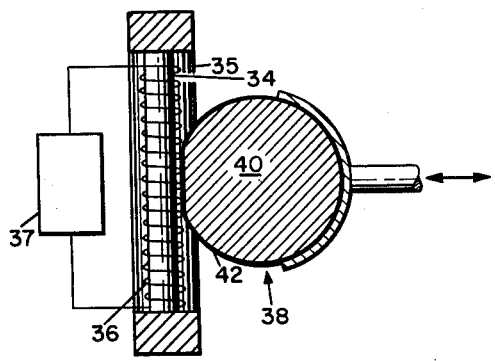
FIGURE 3 shows an embodiment wherein the resistive element comprises a coiled resistive member supported by a non-conductive core and the conductive member comprises an elastic ball having a conductive plating.
Figure 4:
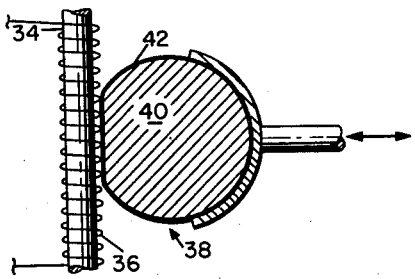
FIGURE 4 shows the embodiment of FIGURE 3 with the shunting contact between the conductive member and resistive element changed due to a change in their relative positions.

FIGURES 3 and 4 show an alternate construction of the resistive element and conducting member wherein upon relative physical movement, a stepped signal is available. In this embodiment a rod 34, preferably of plastic or other material, is supported at either end in housing 35 with a resistive element 36, which may be an insulated resistance wire, coiled thereabout. The resistance wire 36 may be in a circuit 37, such as a bridge circuit or other type circuit, having a power source to cause an electrical signal to pass through wire 36. Intermediately of the coil 36 the insulation is removed along the outer surface of a number of loops but with the loops remaining insulated from one another.

A ball 38 having an elastic center 40 and an outer plating 42 of a conductive material, such as silver, is aligned with the portion of coil 36 having its insulation removed. Movement of ball 38 towards and away from coil 36 will cause respectively an increasing and decreasing number of loops to come into electrical contact with the conductive coating 42 of the ball due to the longitudinal displacement of the ball along the exposed loops. FIGURE 4 shows a second position wherein ball 38 has been moved towards the wire 36 and is shown engaging a larger number of loops.

Each time an additional loop is shunted by contact with the conductive coating 42, the resistance between the ends of wire 36 will drop abruptly a predetermined amount since the resistance of an entire loop has been shunted. This will give a stepped increase to the signal through coil 36 resulting in a more sensitive transducer and one that may be adapted to special purposes in computers or other systems.

Figure 5:
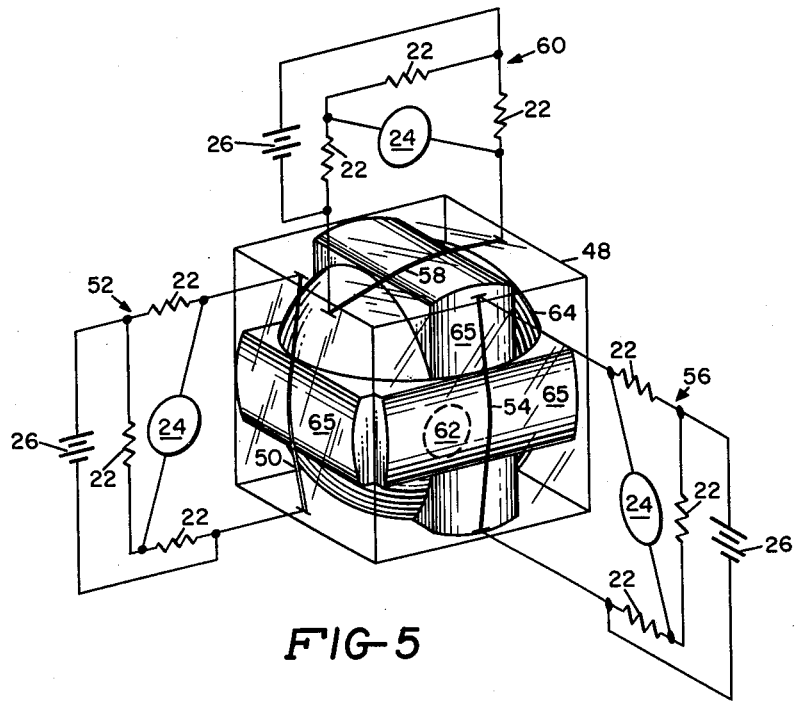
FIGURE 5 is a perspective schematic showing of an accelerometer wherein an inertia member is spring loaded against a plurality of resistive elements.
Figure 6:
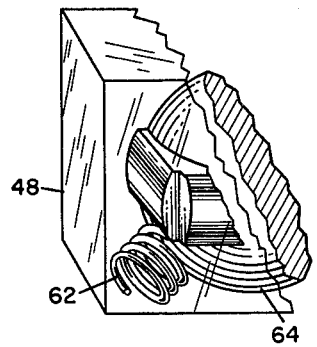
FIGURE 6 is a view of the spring mounting of the embodiment shown in FIGURE 3.

In FIGURES 5 and 6 is shown an accelerometer of this invention adapted for placement in a vehicle or other member, such as a missile, to measure the magnitude and direction of any acceleration experienced by the vehicle or member. In effect, this is a three dimensional application of the aforementioned embodiments of this invention wherein an inertia member, such as a metal unit, is urged against resistive elements in three mutually perpendicular planes.

In FIGURE 5 is seen a transparent housing or box 48 having a top, bottom and four sides. Resistive element 50 is parallel to and spaced slightly inwardly from one of the sides and has its ends secured to the top and bottom of the box. The ends of element 50 are connected to a bridge circuit 52, similar to the circuit shown in FIGURE 1. Resistive element 54 is parallel to and spaced inwardly from a second side of the box and is also secured at its ends to the top and bottom of the box and is connected to a similar bridge circuit 56. Resistive element 58 is parallel to and spaced downwardly from the top of box 48 and has its end secured to opposite sides of the box and also may be connected to a bridge circuit 60. Elements 50, 54 and 58 may be of the material and configuration given for resistive element 20 in a previous embodiment or of any other suitable resistive material.

A spring 62 (FIGURu 6) is located in box 48 in a corner opposite the intersection of the top and sides along which the resistive elements are placed and urges a conductive inertia member 64 against resistive elements 50, 54 and 58 with a predetermined pressure. Cylindrical portions 65 are formed about member 64 and contact the resistive elements 50, 54 and 58. Member 64 is preloaded by spring 62 so that the cylindrical sections 65 are in a predetermined length of electrical contact with each resistive element in a neutral or rest position. Member 64 may be of a solid metallic material, such as platinum, but may be hollow, such as member 66 in FIGURE 7 or may be of other material and configurations according to the purpose for which it is to be used.

The housing 48 is fixed to the vehicle, or other member for which acceleration is to be measured, and, as shown, the inertia member 64 is supported solely within the housing by spring 62 and resistive elements 50, 54 and 58, which are elastic. On any acceleration of the vehicle, member 64 will tend to stay in its initial position and, therefore, be displaced in the housing in a direction opposite to the acceleration. When this happens, the area of contact between the cylindrical sections of member 64 and their respective resistive elements will change accordingly, with the change being indicated in the respective bridge circuits. Since the resistive elements are spaced along three mutually perpendicular planes, any direction of acceleration can be measured and determined by comparing the simultaneous outputs of the bridge circuits. The magnitudes of acceleration can be determined from the magnitude of the signals in the bridge circuits. Each cylindrical section of member 64 shunts its respective resistive elements in a manner similar to the shunting of resistive element 20 by surface 30 of member 28 in FIGURE 1 with the change in shunting contact length resulting in an increasing change in the respective bridge circuit. As mentioned, to obtain a desired linearity, the configuration of each cylindrical surface can be adjusted as desired and/or the resistance of the resistive element can be graduated in the contact area in a desired manner.

All of the bridge circuits, or other circuits in place thereof, may be integral portions of an auto pilot, guidance system, computing mechanism, or other type of circuit which will digest the outputs of the bridge circuits to provide an automatic guidance signal or indicating signal. The accelerometer box or housing 48 may be of very small dimensions so as to include a volume as low as 1/64 cubic inch so that in those systems where space is critical, it has a special advantage. Also, due to the simplicity of construction, there would be a minimum of repair and maintenance problems and the initial cost of fabrication would be relatively small.

Figure 7:
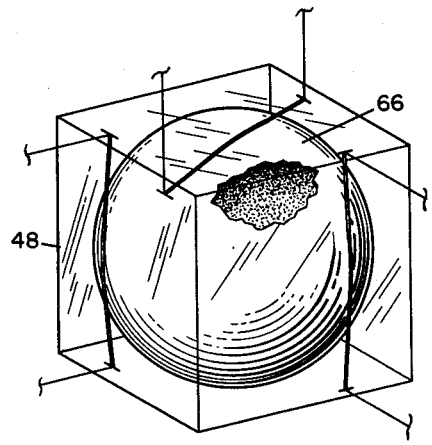
FIGURE 7 shows an embodiment corresponding to the embodiment shown in FIGURE 5 wherein the inertia member is of a hollow construction so that the range of acceleration is increased.

As mentioned, the inertia member 64 may take the configuration of the hollow member shown in FIGURE 7 and this would be advantageous where it is desired to increase the range of the accelerometer to include the measurement of very high accelerations. The system may be designed for any particular range of acceleration by providing an inertia member 64 of the proper mass.

Pressure members utilizing the principles of this invention can be designed for use in measuring or recording changes in pressure, weight, temperatures, position measurements, and other measurements. The remarkable simplicity and properties of this invention will make its use desirable in many more fields.

Having thus described my invention, I claim:

1. A transducer accelerometer comprising a plurality of resistive members of a solid material secured in a common housing, circuit means for applying an electrical signal through each of said resistive members, a conductive member of a solid material having an electrical resistance less than the resistance of each of said resistive members, said conductive member simultaneously engageable with each of said resistive members, said conductive member being successively and elastically engageable with each of said resistive means to form electrical contact lengths corresponding to the direction and magnitude of relative movement between said conductive member and said housing, said resistive members having a surface contact with said conductive member which is increased due to relative movement toward one another and decreased upon relative movement away from one another said variable contact lengths between the conductive member and the resistive members forming a variable shunt to the resistive members to accordingly change the electrical signal in the respective circuits, each of said resistive members comprising a longitudinal member secured at each end to the housing and said conductive member being simultaneously engaged along a plurality of sides with said resistive members in a plurality of non-parallel planes.

2. A transducer accelerometer comprising a plurality of resistive members of a solid material secured in a common housing, circuit means for applying an electrical signal through each of said resistive members, a conductive member of a solid material having an electrical resistance less than the resistance of each of said resistive members, said conductive member simultaneously engageable with each of said resistive members, said conductive member being successively and elastically engageable with each of said resistive means to form electrical contact lengths corresponding to the direction and magnitude of relative movement between said conductive member and said housing, said variable contact lengths between the conductive member and the resistive members forming a variable shunt to the resistive members said resistive members having a surface contact with said conductive member which is increased due to relative movement toward one another and decreased upon relative movement away from one another to accordingly change the electrical signal in the respective circuits, each of said resistive members comprising a longitudinal member secured at each end to the housing, said conductive member being engaged along a plurality of sides with said resistive members in a plurality of non-parallel planes, said conductive member having a plurality of cylindrical surfaces, each of said surfaces being adapted for contacting at least one of said longitudinal members.

3. A transducer accelerometer comprising a plurality of resistive members of a solid material secured in a common housing, circuit means for applying an electrical signal through each of said resistive members, a conductive member of a solid material having an electrical resistance less than the resistance of each of said resistive members. said conductive member simultaneously engageable with each of said resistive members, said conductive member being successively and elastically engageable with each of said resistive means to form electrical contact lengths corresponding to the direction and magnitude of relative movement between said conductive member and said housing, said resistive members having a surface contact with said conductive member which is increased due to relative movement toward one another and decreased upon relative movement away from one another said variable contact lengths between the conductive member and the resistive members forming a variable shunt to the resistive members to accordingly change the electrical signal in the respective circuits, each of said resistive members comprising a longitudinal member secured at each end to the housing, said conductive member being engaged along a plurality of sides with said resistive members in a plurality of non-parallel planes, said conductive member having a plurality of cylindrical surfaces, each of said surfaces being adapted for contacting at least one of said longitudinal members, said cylindrical surfaces being substantially transverse to said longitudinal members.

4. The accelerometer of claim 1 wherein said resistive members comprise a supported coil of resistive material, said conductive member being engageable with successive loops of said coil to provide a stepped signal in said circuit means.

5. The accelerometer of claim 1 wherein said resistive members comprise a substantially rigid longitudinal member and said conductive member comprises an elastic body with a conductive surface.

6. The accelerometer of claim 1 wherein said conductive member is a substantially rigid unit that is hollowed, to increase the range of said accelerometer.

7. The accelerometer of claim 1 wherein said conductive member is an elastic ball with a conductive surface.

8. A transducer especially an accelerometer comprising a plurality of resistive members of a solid material secured in a common housing, circuit means for applying an electrical signal through each of said resistive members, a conductive member of a solid material having an electrical resistance less than the resistance of each of said resistive members, said conductive member being simultaneously engageable with each of said resistive members in a plurality of non-parallel planes, said conductive member being successively and elastically engageable with each of said resistive means to form electrical contact lengths corresponding to the direction and magnitude of relative movement between said conductive member and said housing, said resistive members having a surface contact with said conductive member which is increased due to relative movement toward one another and decreased upon relative movement away from one another said contact lengths between the conductive member and the resistive members forming a variable shunt to the resistive members to accordingly change the electrical signal in the respective circuits, said conductive member being spring loaded against said resistive members whereby the number of required resistive members is lessened.

9. A transducer comprising a cubical housing, a first wire having a predetermined resistance stretched between a first pair of opposite walls of said housing, a second wire having a predetermined resistance being stretched between a second pair of opposite walls of said housing different than said first pair, a power supply and current measuring means being connected across each of said wires to effectively measure the resistance across said wires, a member having a predetermined resistance substantially less than the resistance of said wires and being inside said cubical housing and having cylindrical surfaces in contact with each of said wires, said member movable toward said wires increasing the surface contact therebetween and movable away from said wires decreasing the contact therebetween.

10. The transducer of claim 9 having a third wire of a resistance substantially greater than said member, said third wire being stretched between a pair of opposite walls of said housing different than said first and second pair of walls, a power supply and current measuring means being connected across said third wire to effectively measure the resistance of said third wire, said member having a cylindrical surface in contact with said third wire, said member movable toward said third wire increasing the surface contact therebetween and movable away from said third wire decreasing the contact therebetween.

11. The transducer of claim 9 having spring means urging said member against said wires by a predetermined amount.

References Cited in the file of this patent

UNITED STATES PATENTS

| | | |
|---|---|---|
| 1,317,072 | Carlier | Sept. 23, 1919 |
| 1,448,681 | Stoekle | Mar. 13, 1923 |
| 1,683,059 | Deventer | Sept. 4, 1928 |
| 2,338,732 | Nosker | Jan. 11, 1944 |
| 2,377,212 | Cottrell | May 29, 1945 |
| 2,435,254 | Ramberg | Feb. 3, 1948 |
| 2,439,092 | Linstrom | Apr. 6, 1948 |
| 2,494,109 | Wolfe | Jan. 10, 1950 |
| 2,601,259 | Busignies | June 24, 1952 |
| 2,752,558 | Kane | June 26, 1956 |
| 2,814,203 | Donohoe | Nov. 26, 1957 |
| 2,906,980 | Traite | Sept. 29, 1959 |

FOREIGN PATENTS

| | | |
|---|---|---|
| 1,177,677 | France | Dec. 1, 1958 |